US012716173B2

(12) United States Patent
Ljungqvist et al.

(10) Patent No.: US 12,716,173 B2
(45) Date of Patent: Aug. 25, 2026

(54) BARRIER PAPER OR BARRIER FILM COMPRISING HIGHLY REFINED PULP FROM FIBERS OBTAINED FROM USED BEVERAGE CARTONS

(71) Applicant: Stora Enso OYJ, Helsinki (FI)

(72) Inventors: Carl-Henrik Ljungqvist, Karlstad (SE); Kaj Backfolk, Lappeenranta (FI)

(73) Assignee: Stora Enso OYJ, Helsinki (FI)

( * ) Notice: Subject to any disclaimer, the term of this patent is extended or adjusted under 35 U.S.C. 154(b) by 84 days.

(21) Appl. No.: 18/705,159

(22) PCT Filed: Oct. 25, 2022

(86) PCT No.: PCT/IB2022/060238

§ 371 (c)(1),
(2) Date: Apr. 26, 2024

(87) PCT Pub. No.: WO2023/073551

PCT Pub. Date: May 4, 2023

(65) Prior Publication Data

US 2025/0361681 A1 Nov. 27, 2025

(30) Foreign Application Priority Data

Oct. 29, 2021 (SE) .................................. 2151335-3

(51) Int. Cl.
*D21H 21/14* (2006.01)
*B32B 27/10* (2006.01)
(Continued)

(52) U.S. Cl.
CPC ............ *D21H 21/14* (2013.01); *B32B 27/10* (2013.01); *B32B 27/32* (2013.01); *B65D 65/40* (2013.01);
(Continued)

(58) Field of Classification Search
None
See application file for complete search history.

(56) References Cited

U.S. PATENT DOCUMENTS 5,900,111 A 5/1999 Nyström et al.
9,447,541 B2 9/2016 Heiskanen et al.
(Continued)

FOREIGN PATENT DOCUMENTS

EP 2872330 A1 5/2015
EP 3561178 A 10/2019
(Continued)

OTHER PUBLICATIONS

English translation of Teeri et al. (ES 2280588). (Year: 2007).*
(Continued)

*Primary Examiner* — Ronak C Patel
(74) *Attorney, Agent, or Firm* — Greer, Burns & Crain, Ltd.

(57) ABSTRACT

The present invention relates to a barrier paper or barrier film for a food or liquid packaging laminate, said barrier paper or barrier film comprising: a substrate layer comprising a highly refined cellulose composition comprising fibers obtained from used beverage cartons (UBC), and a polymeric gas barrier coating disposed on at least one side of the substrate layer.

14 Claims, 2 Drawing Sheets

(51) Int. Cl.

| | |
|---|---|
| ***B32B 27/32*** | (2006.01) |
| ***B65D 65/40*** | (2006.01) |
| ***B65D 65/42*** | (2006.01) |
| ***D21H 11/14*** | (2006.01) |
| ***D21H 19/10*** | (2006.01) |
| ***D21H 19/84*** | (2006.01) |
| ***D21H 27/10*** | (2006.01) |

(52) U.S. Cl.

CPC ............. *B65D 65/42* (2013.01); *D21H 11/14* (2013.01); *D21H 19/10* (2013.01); *D21H 19/84* (2013.01); *D21H 27/10* (2013.01); *B32B 2250/40* (2013.01); *B32B 2255/12* (2013.01); *B32B 2255/26* (2013.01); *B32B 2307/718* (2013.01); *B32B 2307/7244* (2013.01); *B32B 2439/70* (2013.01); *B32B 2553/00* (2013.01)

(56) References Cited

U.S. PATENT DOCUMENTS

| | | | | |
|---|---|---|---|---|
| 10,913,759 | B2 | 2/2021 | Heiskanen et al. | |
| 2010/0065235 | A1* | 3/2010 | Fike ...................... | D21H 13/08 162/146 |
| 2018/0245289 | A1* | 8/2018 | Heiskanen ............ | D21H 19/36 |
| 2022/0290374 | A1 | 9/2022 | D'Agnone | |

FOREIGN PATENT DOCUMENTS

| | | | | |
|---|---|---|---|---|
| JP | H0627539 | U | 4/1994 | |
| JP | 2004123110 | A | 4/2004 | |
| WO | WO-2013164646 | A1 * | 11/2013 | ............. D21H 19/36 |
| WO | 2014006269 | A1 | 1/2014 | |
| WO | 2020041272 | A1 | 2/2020 | |
| WO | 2021032739 | A1 | 2/2021 | |

OTHER PUBLICATIONS

English translation of Lorenzetti et al. (EP 3368302). (Year: 2019).*

English translation of Koizumi et al. (JP 2020/165068). (Year: 2020).*

International Search Report from corresponding PCT application No. PCT/IB2022/060238, mailed Jan. 17, 2023.

Terhi Suopajärvi et al., Nanofibrillation of deep eutectic solvent-treated paper and board cellulose pulps, Carbohydrate Polymers 169 (2017) 167-175.

Zhou Jinghui (editor), Structures of Paper Sheet and Its Printability, 1st edition, p. 60, China Light Industry Press, Jan. 31, 2013. (3 pages).

Chinese Office Action from corresponding China application No. 202280072818.7, issued on May 30, 2026.

* cited by examiner

BARRIER PAPER OR BARRIER FILM COMPRISING HIGHLY REFINED PULP FROM FIBERS OBTAINED FROM USED BEVERAGE CARTONS

This application is a U.S. National Phase under 35 U.S.C. § 371 of International Application No. PCT/IB2022/060238, filed Oct. 25, 2022, which claims priority under 35 U.S.C. §§ 119 and 365 to Swedish Application No. 2151335-3 filed Oct. 29, 2021.

TECHNICAL FIELD

The present disclosure relates to methods for recycling a fiber fraction from used beverage carton (UBC).

BACKGROUND

The multilayer construction of beverage cartons provides a resource efficient, lightweight and recyclable packaging solution that can be made from renewable resources. Sustainably sourced virgin cellulose fibers provide strength and stiffness whilst the other layers provide barriers to liquid, water vapor, oil/grease, oxygen and light to protect the packed contents. The correct combination of materials ensures food transport and storage safety, while preventing food spoilage and waste by protecting the contents from deterioration. These barrier layers may consist of various polymers or a combination of polymers and aluminum foils or coatings, depending on the type of product to be packaged, and whether the product is kept refrigerated or if it is distributed and stored at room temperature.

Beverage carton in its simplest form comprises at least one paperboard layer and at least one liquid barrier layer, typically a polyolefin layer. Beverage carton may further comprise an additional barrier layer, typically an aluminum foil or coating layer, or a high barrier polymer layer such as polyamide or EVOH. Such beverage carton is often used for aseptic packaging and is therefore often referred to as aseptic beverage carton.

The typical structure of an aseptic carton includes a polyolefin, typically LDPE (low density polyethylene), outer layer which provides a moisture and liquid barrier, protects the printing ink layer applied to the board and enables the package to be heat sealed. The type of paperboard used depends on the product being packed, the market where it will be sold and the manufacturing conditions, but it is commonly a two or three ply or even up to five ply material with a bleached or clay-coated outer layer and often contains CTMP (chemithermomechanical pulp), TMP (thermomechanical pulp), brown pulp or high yield pulp; the paperboard gives the package the required mechanical rigidity and typically represents about 65-75% of the total weight of the package. The inner side of the paperboard is coated with LDPE to tie it to the aluminum foil layer that provides an odor, light, and gas barrier. Adhesion of the aluminum foil to the innermost plastic layer is achieved through the use of a tie layer, e.g. of EMAA (poly(ethylene-co-methacrylic acid). Finally, an inner layer of LDPE is applied to enable heat sealing of the carton.

The term used beverage carton (UBC) is used herein to denote post-consumer beverage carton, and particularly post-consumer aseptic beverage carton, which has been collected after being used.

The composition of UBC is different compared to many other recycled sources. UBC is typically characterized by:

- High amount of bleached or unbleached chemical, semi-chemical, or mechanical fibers
- High plastic content
- High content of aluminum from foils and coatings.
- Food or liquid residues
- High microbe (microorganism) content.
- High amount of organic materials including different fats and oils.
- High content of single and multivalent ions or salts.
- Possible presence of heavy metals.
- Non-intentionally added substances (NIAS).
- Mixed waste containing packaging and packaging items such as single use components (caps, straws and long stringy materials such as baling wire, etc.)

The collected UBC can contain printing ink and varnish. Although usually most of the fiber is not directly subjected to printing ink, the dissolved ink or ink fragments can re-redeposit onto the fibers during the disintegration step.

Recycling can be categorized as primary, secondary, tertiary, and quaternary recycling. Primary recycling refers to reprocessing the material back into its original use or comparable products with equivalent or higher quality, but this is currently not an option for post-consumer cartons as they cannot be directly converted back into their original use. Secondary recycling, wherein materials are processed and used in applications not requiring virgin material properties is the most widespread recycling option for UBC. The paper fibers are separated from the polymer and aluminum residual (also referred to herein as the PolyAl residual) and the fibers are incorporated into paper products. Another secondary recycling process involves converting the shredded UBC into construction materials. Tertiary recycling involves breaking a product down into its chemical building blocks, and then recycling those chemicals into various products. Quaternary recycling of UBC involves incineration with energy recovery, although this process is not considered as recycling in many countries.

Due to its multilayer structure and characteristic composition, it is difficult to efficiently recycle and reuse UBC. As a result, UBC is today often collected and then either disposed as landfill, burned or processed into different lower value fractions (e.g. a polymer-rich fraction, a fiber-rich fraction, and a waste water or sludge fraction). The fiber-rich fraction is typically used in composite materials, non-food packaging applications and other grades where higher contents of impurities are tolerated, such as tissues, towels, liner and writing paper.

As the paperboard typically constitutes 65-75% of the total weight of the carton, recovery of this fraction has been the predominant focus of carton recycling approaches. Recycling may be accomplished at a paper mill by recovering the paper fibers using a conventional hydrapulper or a drum pulper. Hydrapulpers are large cylindrical vessels with impellers at the bottom which break apart the paper fibers and produce a relatively dilute slurry of fibers that can be further processed within the mill. Contact between the water and the paper layer occurs in the hydrapulper, and the layers separate due to the hydraulic forces inside the pulper. No chemicals are required, but solvents or acid or alkaline solutions may sometimes be used to improve the separation efficiency. The consistency of the pulp in the hydrapulper is typically below 15 wt %. Hydrapulpers are generally equipped with a ragger which removes the PolyAl residual, caps, straws and long stringy materials such as baling wire from the slurry. After removal from the pulper, the PolyAl residual is washed in a perforated rotating cylinder to recover any entrained fibers. A drum pulper is basically a rotating, inclined drum with baffles, which separates the debris from the fibers in pulping and screening sections with minimal fiber loss.

While many paper mills have hydrapulpers that could recycle UBC, the fact that the maximum theoretical yield is just 75% compared to 85% or more for other paper packaging is a disincentive, as is the challenge of economically processing the PolyAl residual. Furthermore, the high amounts of impurities in recovered UBC fibers, particularly from food residues and non-intentionally added substances (NIAS), can make them unsuitable for mixing into virgin or less contaminated pulp streams. Today, there are strict regulations and limitations on the use of recycled material in paperboard manufacturing processes. Fibers obtained from UBC may contain components that should not be allowed back into a paperboard making process. Examples include plastic particles, metals metal compounds, optical brightening agents (OBA) or fluorescent whitening agents (FWA), ink residuals or mineral oils, and in particular microbes, toxic components, and food residues. These impurities can interfere with wet end chemistry (process performance), but also end product properties (mechanical or product performance, barrier properties, impurities, microbial growth, etc.).

Fibers obtained from UBC may often exhibit high microbial activity, or high microbial load, and microbial deactivation or sterilization of the fibers or pulps is typically required before they can be reused.

Another challenge with recycled UBC is that Fibers obtained from UBC are considered as downgraded when they are recycled and reused. This downgrading is partly due to reduced mechanical properties caused by excessive mechanical and chemical treatment. The recycled fibers may be mechanically damaged or treated using methods that affect, e.g., their strength and mechanical performance.

Generally, only virgin paper fibers are used in the manufacture of paperboard for food or beverage packaging applications. There is a need to increase the amount of recycled fiber content in paperboard for food packaging applications. Due to the high degree of contamination, microbial load, and downgrading of the recycled material it is commonly assumed that fibers from UBC cannot be efficiently reused in food or beverage packaging laminates or products.

Thus, there is a need to find methods that allow pulp from UBC to be used in food or beverage packaging substrates and laminates, especially in higher contents, without affecting mechanical properties of the substrates and laminates or causing risks for contamination of packaged contents.

DESCRIPTION OF THE INVENTION

It is an object of the present disclosure to provide a method that allows pulp from used beverage carton (UBC) to be reused in applications and products where typically only virgin paper fibers are used, such as in food or beverage packaging substrates and laminates.

It is an object of the present disclosure to provide a method that allows pulp from used beverage carton (UBC) to be reused in food or beverage packaging substrates and laminates without negatively affecting mechanical properties of the substrates and laminates or causing risks for contamination of packaged contents.

It is an object of the present disclosure to provide a method that allows pulp from used beverage carton (UBC) to be reused in food or beverage packaging substrates and laminates without contamination of non-UBC pulp and process water streams by the UBC pulp.

The above-mentioned objects, as well as other objects as will be realized by the skilled person in the light of the present disclosure, are achieved by the various aspects of the present disclosure.

The present invention is based on the realization that many of the problems associated with reusing fibers obtained from UBC in paperboard can be mitigated or solved by preparing the recycled UBC fibers in the form of a highly refined cellulose composition or a microfibrillated cellulose (MFC) composition and making a highly refined cellulose or MFC paper or film, such as a machine glazed (MG) paper, glassine paper, greaseproof paper, or a MFC barrier film. Depending on the type of paper or film to be prepared, the highly refined cellulose composition may be used by itself or combined with other, less refined fibers. The highly refined cellulose or MFC paper or film may advantageously be combined with other barrier coatings or layers and used as a barrier film in packaging laminates.

By incorporating the fibers obtained from UBC in a separate barrier film of a packaging laminate the inventive method allows for higher amounts of UBC fibers to be incorporated in paperboard, e.g. paperboard for packaging laminates, than would be possible if the UBC fibers were to be mixed with non-UBC fibers. As the inventive UBC containing barrier paper or barrier film can be manufactured separately from non-UBC containing paper or paperboard layers used in a packaging laminate, contamination of the non-UBC pulp and process water streams by the UBC pulp and process water streams can be prevented or at least minimized.

According to a first aspect illustrated herein, there is provided a barrier paper or barrier film for a food or liquid packaging laminate, said barrier paper or barrier film comprising:

- a substrate layer comprising a highly refined cellulose composition comprising fibers obtained from used beverage cartons (UBC), and
- a polymeric gas barrier coating disposed on at least one side of the substrate layer.

The highly refined cellulose composition has preferably been subjected to refining to a Schopper-Riegler (SR) value in the range of 50-100, as determined by standard ISO 5267-1. In some embodiments, the highly refined cellulose composition has a Schopper-Riegler (SR) number in the range of 70-100, preferably in the range of 85-98, more preferably in the range of 90-98, as determined by standard ISO 5267-1. Refining, or beating, of cellulose pulps refers to mechanical treatment and modification of the cellulose fibers in order to provide them with desired properties.

The fibers obtained from UBC are preferably present in the highly refined cellulose composition in an amount of 20-100 wt % based on the total dry fiber weight of the highly refined cellulose composition. In some embodiments, the fibers obtained from UBC are the main fiber type in the highly refined cellulose composition. In some embodiments, the fibers obtained from UBC are present in the highly refined cellulose composition in an amount of 50-100 wt %, 60-100 wt %, or 70-100 wt %, based on the total dry fiber weight of the highly refined cellulose composition. The fibers obtained from UBC may be mixed with non-UBC cellulose fibers. The rest of the dry fiber weight of the fiber fraction may typically be made up of non-UBC cellulose fibers. The non-UBC cellulose fibers may for example be obtained from chemical pulp, chemimechanical pulp (CMP), chemi-thermomechanical pulp (CTMP), high-temperature chemi-thermomechanical pulp (HT-CTMP), thermomechanical pulp (TMP), or broke. The non-UBC cellulose fibers are preferably virgin fibers or pre-consumer recycled fibers. The fibers may be softwood fibers, hardwood fibers or non-wood fibers and may be bleached or unbleached. In some embodiments the highly refined cellulose composition consists entirely or almost entirely of fibers obtained from UBC.

Depending on the purpose of barrier paper or barrier film, the highly refined cellulose composition may be used by itself in the substrate layer or be combined with another, less refined cellulose composition. The substrate layer preferably comprises at least 10 wt % of the highly refined cellulose composition. In some embodiments, the substrate layer comprises at least 20, 30, 40, 50, 60, 70, 80 or 90 wt % of the highly refined cellulose composition. In some embodiments, the remaining fibers in the substrate layer are a less refined cellulose composition.

The less refined cellulose composition may for example comprise fibers obtained from chemical pulp, CMP, CTMP, HT-CTMP, TMP, or broke. The fibers may be softwood fibers, hardwood fibers or non-wood fibers and may be bleached or unbleached. In some embodiments the highly refined cellulose composition consists entirely or almost entirely of fibers obtained from UBC. The less refined cellulose composition may for example have a Schopper-Riegler (SR) value in the range of 20-40, as determined by standard ISO 5267-1.

The substrate layer formed from a highly refined cellulose composition typically exhibits good gas barrier properties on its own, but also provides a smooth and dense substrate well suited for coating with additional barrier coating layers. The barrier paper or barrier film for a food or liquid packaging laminate further comprises at least a polymeric gas barrier coating disposed on at least one side of the substrate layer. In addition to providing barrier properties to a packaging laminate in which the inventive barrier paper or barrier film is included, the polymeric gas barrier coating may also prevent migration of odors or contaminants present in the substrate layer into adjacent laminate layers.

In some embodiments, the barrier paper or barrier film comprises a polymeric gas barrier coating disposed on both sides of the substrate layer.

In some embodiments, the polymeric gas barrier coating comprises one or more water soluble film forming polymers. In some embodiments, the polymeric gas barrier coating comprises one or more water soluble or water dispersible film forming polymers selected from the group consisting of polysaccharides, proteins, hemicellulose, polyvinyl alcohol, polyvinyl alcohol acetate, polyvinyl acetate, polyvinyl pyrrolidone, acrylic polymers, acrylic copolymers, polyurethane, and latex emulsions, such as styrene/acrylate latex. In some embodiments, the polysaccharides are selected from starch, modified starch, alginate, alginic acid, and cellulose derivatives, preferably carboxymethyl cellulose. In some embodiments, the polyvinyl alcohol is hydrolyzed to at least 88%, preferably above 92%.

The coat weight of the polymeric gas barrier coating is preferably in the range of 0.1-12 gsm, preferably in the range of 0.3-12 gsm, and more preferably in the range of 1-8 gsm. The polymeric gas barrier coating may be applied in a single layer as multiple layers.

In some embodiments, the substrate layer is subjected to calandering before and/or after the polymeric gas barrier coating is applied. The calandering may include machine calandering, soft calandering and/or supercalandering. One preferred method is to machine or soft calander the substrate layer before coating and then to soft or supercalander the coated substrate layer after coating.

In some embodiments, the barrier paper or barrier film further comprises a metallization layer formed on the polymeric gas barrier coating.

Metallization refers to a family of processes used to deposit layers of metals or metal oxides atom-by-atom or molecule-by-molecule on a solid surface. Multiple layers of the same or different materials can be combined. The process can be further specified based on the vapor source; physical vapor deposition (PVD) uses a liquid or solid source and chemical vapor deposition (CVD) uses a chemical vapor.

In some embodiments, the metallization layer is formed by vapor deposition of a metal or metal oxide on the polymeric gas barrier coating, preferably by physical vapor deposition (PVD) or chemical vapor deposition (CVD).

In some embodiments, the metallization layer comprises a metal or metal oxide selected from the group consisting of aluminum, magnesium, silicon, copper, aluminum oxides, magnesium oxides, silicon oxides, and combinations thereof, preferably an aluminum oxide. Aluminum oxide vacuum coatings also known as AlOx coatings can provide similar barrier properties as aluminum metal coatings, but have the added advantage of thin AlOx coatings being transparent to visible light.

The metallization layer may have a thickness in the range of from 1 to 500 nm. In some embodiments, the metallization layer has a layer thickness in the range of 1-100 nm, preferably in the range of 10-100 nm, and more preferably in the range of 20-50 nm. In some embodiments, the metallization layer has a basis weight in the range of 50-250 mg/m$^2$, preferably in the range of 75-150 mg/m$^2$.

One preferred type of metallization coating, often used for its barrier properties, in particular water vapour barrier properties, is an aluminum metal physical vapour deposition (PVD) coating. Such a coating, substantially consisting of aluminum metal, may typically have a thickness of from 10 to 50 nm. The thickness of the metallization layer corresponds to less than 1% of the aluminum metal material typically present in an aluminum foil of conventional thickness for packaging, i.e. 6.3 μm.

In some embodiments, the barrier paper or barrier film has an oxygen transfer rate (OTR), measured according to the standard ASTM F-1927 at 50% relative humidity and 23° C., of less than 100 cc/m$^2$/24 h/atm, preferably less than 50 cc/m$^2$/24 h/atm, preferably less than 20 cc/m$^2$/24 h/atm, preferably less than 10 cc/m$^2$/24 h/atm.

The barrier paper or barrier film typically has a gurley hill porosity of 30 000 s/100 ml or higher, preferably 35 000 s/100 ml or higher, or more preferably 40 000 s/100 ml or higher, as measured according to standard ISO 5636/5.

The barrier paper or barrier film typically has a bendtsen surface roughness value of 500 ml/minute Bendtsen or lower, preferably 350 ml/minute Bendtsen or lower, and more preferably 250 ml/minute Bendtsen or lower.

The barrier paper or barrier film will typically exhibit good resistance to grease and oil. Grease resistance of the barrier paper or barrier film is evaluated by the KIT-test according to standard ISO 16532-2. The test uses a series of mixtures of castor oil, toluene and heptane. As the ratio of oil to solvent is decreased, the viscosity and surface tension also decrease, making successive mixtures more difficult to withstand. The performance is rated by the highest numbered solution which does not darken the sheet after 15 seconds. The highest numbered solution (the most aggressive) that remains on the surface of the paper without causing failure is reported as the "kit rating" (maximum 12). In some embodiments, the KIT value of the barrier paper or barrier film is at least 10, preferably 12, as measured according to standard ISO 16532-2.

In some embodiments, the barrier paper or barrier film has a wet strength in the range of 0.3 to 0.8 kN/m, as measured according to standard ISO 3781.

In some embodiments, the barrier paper or barrier film further comprises a polymeric sealing layer disposed on at least one side of the substrate layer.

In some embodiments, the barrier paper or barrier film comprises a polymeric sealing layer disposed on both sides of the substrate layer.

In some embodiments, the polymeric sealing layer is applied by glue lamination. Glue lamination may for example be performed using a polymeric dispersion comprising a polyolefin, a styrene-acrylate (SA) latex, or a polyvinyl alcohol (PVOH).

In some embodiments, the polymeric sealing layer is applied in the form of a heat lamination of a thermoplastic polymer film, by extrusion coating lamination of a thermoplastic polymer, or by application of a solution or dispersion of a thermoplastic polymer.

The polymeric sealing layer may comprise any of the thermoplastic polymers commonly used in paper or paperboard-based packaging materials in general or polymers used in liquid packaging board in particular. Examples include polyethylene (PE), polyethylene terephthalate (PET), polypropylene (PP), polyhydroxyalkanoates (PHA), polylactic acid (PLA), polyglycolic acid (PGA), thermoplastic starch and thermoplastic cellulose. Polyethylenes, especially low-density polyethylene (LDPE) and high-density polyethylene (HDPE), are the most common and versatile polymers used in liquid packaging board. In some embodiments, the polymeric sealing layer comprises a polyolefin layer, preferably a polyethylene layer.

The basis weight of each polymeric sealing layer is preferably less than 50 g/m$^2$. In order to achieve a continuous and substantially defect free film, a basis weight of the polymer layer of at least 8 g/m$^2$, preferably at least 12 g/m$^2$ is typically required. In some embodiments, the basis weight of the polymeric sealing layer is in the range of 8-50 g/m$^2$, preferably in the range of 12-50 g/m$^2$.

In some embodiments, the grammage of the substrate layer is in the range of 15-120 gsm, preferably in the range of 20-70 gsm.

In some embodiments, the density of the substrate layer is in the range of 800-1800 kg/m$^3$, preferably in the range of 850-1350 kg/m$^3$.

In some embodiments, the highly refined cellulose composition has a content of fibers having a length >0.2 mm of at least 10 million fibers per gram based on dry weight, and preferably at least 15 million fibers per gram based on dry weight.

In some embodiments, the highly refined cellulose composition has a mean fibril area of fibers having a length >0.2 mm value of at least 14%, preferably at least 20%, more preferably at least 22%.

In some embodiments, the highly refined cellulose composition is a microfibrillated cellulose (MFC) composition.

In some embodiments, the highly refined cellulose composition is obtained by:

i) providing a fiber fraction comprising 20-100 wt % fibers obtained from used beverage cartons (UBC) based on the total dry fiber weight of the fiber fraction,
ii) optionally subjecting the fiber fraction to mechanical, chemical or enzymatic pre-treatment, or a combination thereof,
iii) subjecting the optionally pre-treated fiber fraction to refining at a consistency in the range of 0.5-30% by weight to a Schopper-Riegler (SR) value in the range of 50-100, as determined by standard ISO 5267-1, to obtain the highly refined cellulose composition.

The fibers obtained from UBC are preferably present in the fiber fraction in an amount of 20-100 wt % based on the total dry fiber weight of the fiber fraction. In some embodiments, the fibers obtained from UBC are the main fiber type in the fiber fraction. In some embodiments, the fibers obtained from UBC are preferably present in the fiber fraction in an amount of 50-100 wt %, 60-100 wt %, or 70-100 wt %, based on the total dry fiber weight of the fiber fraction. In some embodiments the fiber fraction consists entirely or almost entirely of fibers obtained from UBC. For practical reasons, the fibers obtained from UBC may be mixed with non-UBC cellulose fibers. In some embodiments, the fibers of the fiber fraction provided in step (i) consist of 20-80 wt % fibers obtained from chemical pulp, CMP, CTMP, HT-CTMP, TMP, or broke, and 20-80 wt % fibers obtained from UBC. The fibers may be softwood fibers, hardwood fibers or non-wood fibers and may be bleached or unbleached. In some embodiments the highly refined cellulose composition consists entirely or almost entirely of fibers obtained from UBC. The rest of the dry fiber weight of the fiber fraction may typically be made up of non-UBC cellulose fibers. The non-UBC cellulose fibers may for example be obtained from chemical pulp, CMP, CTMP, HT-CTMP, TMP, or broke. The non-UBC cellulose fibers are preferably virgin fibers or pre-consumer recycled fibers. The fibers may be softwood fibers, hardwood fibers or non-wood fibers and may be bleached or unbleached.

In addition to the fibers the fiber fraction may further comprise components or additives normally present in the preparation of highly refined cellulose compositions.

Fibers obtained from UBC typically comprise high amounts of contaminants and it is therefore commonly assumed that fibers from UBC cannot be reused in food or beverage packaging laminates. To reduce the amounts of contaminants in the highly refined cellulose composition, the fiber fraction used for the inventive method has preferably been subjected to purification before being subjected to pre-treatment and refining. The purification may preferably comprise a fine screening method to remove cellulose fines and fine particulate contaminants. The fine screening method may optionally be combined with an electro-osmosis method to remove further contaminants.

In some embodiments, the fibers obtained from UBC have been subjected to purification using a fine screening method. The present inventors have found that it is advantageous to subject the raw UBC fiber fraction obtained after removal of the PolyAl residual to a fine screening method to remove fines and fine particulate materials. Fine screening has been found to significantly facilitate subsequent washing, bleaching and deactivation of the UBC fiber fraction. A relatively small portion of fines in recycled UBC fiber fractions is responsible to a high degree for the high levels of impurities, high water retention and/or high drainage resistance of the fiber fractions. Fine screening to remove fines and fine particulate materials can remove a significant portion of the particulate contaminants, and the reduced drainage resistance allows for repetitive washing steps to be performed in a shorter period of time, resulting in a fiber fraction with higher purity.

In some embodiments, the fibers obtained from UBC are a purified UBC fiber fraction manufactured according to a method comprising the steps:

a) subjecting UBC starting material to a polymer and aluminum film separation method to obtain a UBC polymer and aluminum fraction and a raw UBC fiber fraction;
b) optionally subjecting the raw UBC fiber fraction to a coarse screening method to remove coarse particles;
c) subjecting the raw UBC fiber fraction to a fine screening method to remove cellulose fines and fine particulate contaminants, wherein the fine screening method comprises at least one fine screening step and at least one dilution step;
d) optionally subjecting the fine screened UBC fiber fraction to a washing method to remove further contaminants;
e) optionally subjecting the fine screened UBC fiber fraction to a bleaching method;
f) subjecting the fine screened, and optionally bleached, UBC fiber fraction to a dewatering method to a consistency of at least 20 wt %; and
g) subjecting the dewatered UBC fiber fraction to a deactivation method to obtain a purified UBC fiber fraction.

In some embodiments, the fibers obtained from UBC have been subjected to purification using an electro-osmosis method. The present inventors have found that subjecting a UBC fiber fraction, particularly a fine screened UBC fiber fraction, to an electro-osmosis method to remove further contaminants not only leads to an efficient removal of metallic and non-metallic ions and salts, but also to a reduction of the content of mineral oil saturated hydrocarbons (MOSH), mineral oil aromatic hydrocarbons (MOAH), OBAs and other organic contaminants of the fiber fraction. This realization allows for a larger portion of the collected UBC to be recycled and reused. Alternatively, it allows for the residual contaminant content of the finished recycled fiber fraction to be reduced, such that more recycled UBC material may be used in new paperboard products. Furthermore, the electro-osmosis method has also been found to reduce the microbial activity of the UBC fiber fraction.

In some embodiments, the fibers obtained from UBC are a purified UBC fiber fraction manufactured according to a method comprising the steps:

a) subjecting a UBC starting material to a polymer and aluminum film separation method to obtain a UBC polymer and aluminum fraction and a raw UBC fiber fraction;
b) optionally subjecting the raw UBC fiber fraction to a coarse screening method to remove coarse particles;
c) subjecting the raw UBC fiber fraction to a fine screening method to remove cellulose fines and fine particulate contaminants, wherein the fine screening method comprises at least one fine screening step and at least one dilution step;
d) optionally subjecting the fine screened UBC fiber fraction to a bleaching method;
e) subjecting the fine screened, and optionally bleached, UBC fiber fraction to an electro-osmosis method to remove further contaminants;
f) optionally subjecting the fine screened, and optionally bleached, UBC fiber fraction to a dewatering method to a consistency of at least 20 wt %; and
g) subjecting the optionally dewatered UBC fiber fraction to a deactivation method to obtain a purified UBC fiber fraction.

In order to obtain a raw fiber fraction suitable for further washing and deactivation, plastics and/or aluminum content is first removed. This is done by subjecting a UBC starting material to a polymer and aluminum film separation method to obtain a UBC polymer and aluminum fraction and a raw UBC fiber fraction. If the UBC starting material does not contain aluminum, the UBC polymer and aluminum fraction may only comprise polymer and no aluminum. The obtained raw UBC fiber fraction is mainly comprised of cellulosic material and comprises significantly less plastics and aluminum than the UBC starting material. The polymer and aluminum film separation method may comprise shredding the UBC starting material and mixing the shredded UBC starting material with water or an aqueous solution. As the mixture is stirred, the fibers absorb moisture and the plastic and aluminum layers of the laminate are loosened. Through mechanical filtration and/or flotation, various fractions are separated to obtain a UBC polymer and aluminum fraction and a raw UBC fiber fraction.

The raw UBC fiber fraction obtained in step (a) preferably comprises at least 80 wt % cellulose fiber, based on dry weight. In some embodiments, the raw UBC fiber fraction obtained in step (a) preferably comprises at least 90 wt % cellulose fiber, preferably at least 95 wt % cellulose fiber, based on dry weight.

In some embodiments, the raw UBC fiber fraction obtained in step (a) has Schopper-Riegler (SR) value in the range of 15-35, preferably in the range of 18-30, as determined by standard ISO 5267-1.

In some embodiments, the raw UBC fiber fraction obtained in step (a) has water retention value (WRV) in the range of 110-200%, preferably in the range of 120-180%, and more preferably in the range of 125-175% as determined by standard ISO 23714.

In some embodiments, the raw UBC fiber fraction obtained in step (a) has a content of “Fines A” as measured using an FS5 optical fiber analyzer (Valmet) of above 22%, preferably above 25%.

In some embodiments, the raw UBC fiber fraction obtained in step (a) comprises above 1 wt % plastic, preferably above 1.2 wt % plastic, based on dry weight.

In some embodiments, the raw UBC fiber fraction obtained in step (a) comprises above 0.2 wt % aluminum, preferably above 0.5 wt % aluminum, based on dry weight.

In some embodiments, the raw UBC fiber fraction obtained in step (a) comprises above 20 mg/kg mineral oil saturated hydrocarbons (MOSH), preferably above 50 mg/kg MOSH, based on dry weight.

In some embodiments, the raw UBC fiber fraction obtained in step (a) comprises above 20 mg/kg mineral oil aromatic hydrocarbons (MOAH), preferably above 50 mg/kg MOAH, based on dry weight.

In some embodiments, the raw UBC fiber fraction obtained in step (a) comprises above 5000 mg/kg extractives, preferably above 10 000 mg/kg extractives, based on dry weight.

In some embodiments, the raw UBC fiber fraction obtained in step (a) comprises above 1000 mg/kg unsaturated fatty acids, preferably above 2000 mg/kg unsaturated fatty acids, based on dry weight.

In some embodiments, the raw UBC fiber fraction obtained in step (a) comprises above 400 mg/kg resin acids, preferably above 500 mg/kg resin acids, based on dry weight.

The amounts of extractives, unsaturated fatty acids, and resin acids were determined using the SCAN-CM 49 method with acidification of pulp to pH<3 using acetic acid. Extraction was made by ASE (Accelerated Solvent Extraction) with acetone at temperature of 100° C., pressure 2000 psi, and 2 cycles. The extracts were analyzed with GC-FID and then calculated against internal standards.

In some embodiments, the raw UBC fiber fraction obtained in step (a) has an ash content (525° C.) above 4% and/or and an ash content (925° C.) above 4%. Raw UBC fiber fractions obtained from some types of sources, e.g. from sources containing mineral or pigment coated carton, may also have significantly higher ash contents.

The term coarse particles as used herein refers generally to particles having a diameter or width above 1 mm.

The term cellulose fines as used herein generally refers to cellulosic particles significantly smaller in size than cellulose fibers.

In some embodiments, the term cellulose fines as used herein refers to fine cellulosic particles, which are able to pass through a 200 mesh screen (equivalent hole diameter 76 μm) of a conventional laboratory fractionation device (SCAN-CM 66:05). There are two major types of fiber fines, namely primary and secondary fines. Primary fines are generated during pulping and bleaching, where they are removed from the cell wall matrix by chemical and mechanical treatment. As a consequence of their origin (i.e., compound middle lamella, ray cells, parenchyma cells), primary fines exhibit a flake-like structure with only minor shares of fibrillar material. In contrast, secondary fines are generated during the refining of pulp. Both primary and secondary fines increase drainage resistance of the pulp and reduce the dewatering speed in the forming section of a paper machine. Because of their large specific surface area in comparison to pulp fibers, fines affect the retention of process chemicals and hence greatly influence the process stability and end product performance.

In some embodiments, the term fine particulate contaminants as used herein refers to fine particles not derived from a cellulosic material, which are able to pass through a 200 mesh screen (equivalent hole diameter 76 μm) of a conventional laboratory fractionation device (SCAN-CM 66:05).

The fine screening method used to remove cellulose fines and fine particulate contaminants from the raw UBC fiber fraction includes at least one fine screening step. The fine screening step may include screening using one or more pressure screens, one or more hydrocyclones, one or more belt filters, or a combination thereof. Other screening methods known by the skilled person for removing fines from a fiber mixture may also be employed.

The fine screening method used to remove cellulose fines and fine particulate contaminants from the raw UBC fiber fraction includes at least one dilution step. The dilution step preferably comprises adding a dilution liquid, preferably water or an aqueous solution to reduce the consistency of the UBC fiber fraction. The dilution step may be performed before and/or after the fine screening step Preferably, dilution is performed at least before the fine screening step in order to reduce the consistency of the UBC fiber fraction before the fine screening step. The consistency of the UBC fiber fraction after dilution may vary depending on the screening or fraction method used. In some embodiments, the dilution factor (DF) is >2, preferably >2.5, >3.0, >3.5, >4, >4.5 or >5. Preferably, the dilution step comprises diluting the UBC fiber fraction to a consistency in the range of 0.1-7 wt %, preferably in the range of 0.3-5 wt %, and more preferably in the range of 0.5-2 wt %. It is also possible to perform screening at higher consistency, especially at the end of a fine screening method comprising more than one screening step.

In some embodiments, the fine screening method reduces the content of fines and fine particulate contaminants in the UBC fiber fraction by at least 20%, preferably by at least 30%, and more preferably by at least 40%. More specifically, in some embodiments, the fine screening method reduces the content of fines in the UBC fiber fraction by at least 20%, preferably by at least 30%, and more preferably by at least 40%, wherein the fines content is the content of "Fines A" as measured using an FS5 optical fiber analyzer (Valmet).

In some embodiments, the fine screening method of step (c) reduces "Fines A" as measured using an FS5 optical fiber analyzer (Valmet) to less than 20%, preferably to less than 17%, and more preferably to less than 15%.

In some embodiments, the fine screening method removes 0.1-10 wt % or 0.1-7.5 wt % or 0.1-5 wt % of the solid content of the raw UBC fiber fraction.

The fine screened UBC fiber fraction is optionally subjected to a further washing method to remove further contaminants subjected to a washing method to remove further contaminants, particularly dissolved, dispersed, soluble, or extractable contaminants. Any suitable pulp washing method for removing contaminants from a pulp mixture may be used. The washing method used to remove further contaminants from the raw UBC fiber fraction may include washing using one or more rotary vacuum washers, rotary pressure washers, pressure and atmospheric diffusion washers, horizontal belt washers and dilution/extraction equipment, or a combination thereof. Other washing methods known by the skilled person for removing fines from a fiber mixture may also be employed. The washing method may preferably comprise two or more washing steps.

The electro-osmosis method involves subjecting the UBC fiber fraction to an electric field, inducing motion of water around charged particles. The electro-osmosis method may also involve electrophoresis, whereby charged particles in the electrical field are attracted and move towards the electrode with the opposite charge. The electric field may for example be created by providing electricity to anode and cathode electrodes of an electro-osmosis device.

In some embodiments, the electro-osmosis method comprises the following steps:

providing a slurry comprising the UBC fiber fraction and liquid, subjecting the slurry to an electric field inducing the liquid of the slurry to flow, separating liquid from the UBC fiber fraction thus obtaining a liquid depleted slurry, adding a washing liquid, preferably water, to the liquid depleted slurry subjecting the liquid depleted slurry to an electric field inducing the washing liquid of the slurry to flow, and separating the washing liquid from the UBC fiber fraction, thus obtaining a purified UBC fiber fraction.

Examples of electro-osmosis methods that could be applied in the present invention include, but are not limited to, those described in U.S. Pat. Nos. 9,447,541 B2 and 10,913,759 B2.

The electro-osmosis method leads to removal of metallic and non-metallic ions and salts from the UBC fiber fraction, but also to a reduction of the OBA content of the UBC fiber fraction. The electro-osmosis method has also been found to reduce the microbial activity of the UBC fiber fraction.

The electro-osmosis is also generally accompanied by dewatering of the UBC fiber fraction. The degree of dewatering is related to the amount of contaminants removed by the electro-osmosis method, but may also be affected by drainage resistance of the UBC fiber fraction, additional pressure or vacuum applied, press fabric permeability, speed, filter cake thickness, consistency etc. The dewatering is preferably done in a continuous mode such as on a belt or wire or press fabric.

In some embodiments, the fine screened UBC fiber fraction is subjected to a bleaching method. The bleaching method may before or after the electro-osmosis method. The bleaching method may for example be selected from the group consisting of hydrogen peroxide bleaching, ozone bleaching, oxygen bleaching, chloride bleaching, hypochlorite bleaching, and extraction bleaching. In a preferred embodiment, the bleaching method is combined with heating the fine screened UBC fiber fraction to a temperature of 50° C. or higher, such as 80° C. or higher, preferably 90° C. or higher, and more preferably 100° C. or higher. The bleaching method may for example comprise a combination of heating and hydrogen peroxide bleaching or heating and hypochlorite bleaching. Such a bleaching method may preferably also lead to an at least partial deactivation of the UBC fiber fraction.

In some embodiments, the fibers obtained from UBC have been subjected to drying at elevated temperature to a consistency of at least 70 wt %, preferably at least 80 wt %, and more preferably at least 90 wt %.

The elevated temperature is preferably 80° C. or higher, preferably 90° C. or higher, and more preferably 100° C. or higher, such as in the range of 110-180° C.

In some embodiments, the heat treatment is performed in a hot disperger (also known as a hot disperser). A hot disperger is a device which uses a combination of heat and mechanical treatment of fibers at high consistency to liquefy, break down and disperse tacky and visible contaminants. The temperature in the hot disperger is preferably 80° C. or higher, preferably 90° C. or higher, and more preferably 100° C. or higher, such as in the range of 110-180° C. The heat treatment in the hot disperger may typically be performed for a duration of 5 seconds to 120 minutes, preferably for 5 seconds to 30 minutes. Heat treatment in a hot disperger can improve dissolution of e.g. starch and residual barrier polymers and additives. Heat treatment in a hot disperger may preferably also lead to an at least partial deactivation of the UBC fiber fraction.

The UBC fiber fraction is subjected to a deactivation method to obtain a purified UBC fiber fraction. The term "deactivation" as used herein refers to microbial deactivation, i.e. a method or treatment which reduces the microbial activity or microbial load of the UBC fiber fraction. The deactivation method kills or deactivates microorganisms and other potential pathogens present in the UBC fiber fraction. The deactivation method may lead to a complete sterilization or a partial deactivation, i.e. a disinfection or a sanitization, of the fiber fraction.

The deactivation preferably reduces the microbial activity of the UBC fiber fraction by at least 30%, preferably at least 40%, at least 50%, or at least 60%, such as in the range of 60-100%. Preferably, the deactivation method reduces the activity of microorganisms and other potential pathogens present in the UBC fiber fraction to a level which is normally accepted for fibers for use in food or beverage packaging substrates and laminates. The deactivated purified UBC fiber fraction has suitable chemical purity, suitable biological purity, and suitable mechanical properties for being reused in food or beverage packaging substrates and laminates.

In some embodiments, the deactivation method comprises heat deactivation, chemical deactivation, and/or irradiation deactivation. The heat deactivation may for example be selected from the group consisting of steam deactivation and dry heat deactivation. The chemical deactivation may for example be selected from the group consisting of ethylene oxide, nitrogen dioxide, ozone, glutaraldehyde and formaldehyde, hydrogen peroxide, and peracetic acid deactivation. The irradiation deactivation may for example be selected from the group consisting of non-ionizing radiation deactivation, and ionizing radiation deactivation. The deactivation method may also comprise a combination of two or more deactivation techniques.

In some embodiments the deactivation method is performed using chemicals conventionally used for bleaching of fibers for use in paper and paperboard. Deactivation may for example be performed using hydrogen peroxide or ozone. Such deactivation using chemicals conventionally used for bleaching of fibers may be advantageous as it may also lead to an at least partial bleaching of the UBC fiber fraction.

In some embodiments, wherein the deactivation method involves elevated temperature the heat treatment and the deactivation method may be combined. For example, deactivation by autoclaving at 121° C. will also constitute a heat treatment of the UBC fiber fraction. As another example, heat treatment in a disperger at a temperature leading to deactivation of the fiber fraction may also constitute a deactivation method.

The purified UBC fiber fraction obtained is preferably suitable for demanding end uses such as for direct or indirect food contact. The resulting purified UBC fiber fraction is preferably suitable for being reused in food or beverage packaging substrates and laminates.

The purified UBC fiber fraction may preferably be used as the fiber fraction in step (i) of the inventive method.

In some embodiments, the purified UBC fiber fraction comprises at least 96 wt % cellulose fiber, preferably at least 98 wt % cellulose fiber, based on dry weight.

In some embodiments, the purified UBC fiber fraction has Schopper-Riegler (SR) value in the range of 15-35, preferably in the range of 18-30, as determined by standard ISO 5267-1.

In some embodiments, the purified UBC fiber fraction has water retention value (WRV) in the range of 110-200%, preferably in the range of 120-180%, and more preferably in the range of 125-175% as determined by standard ISO 23714.

In some embodiments, the purified UBC fiber fraction has a content of "Fines A" as measured using an FS5 optical fiber analyzer (Valmet) of less than 20%, preferably less than 17%, and more preferably less than 15%.

In some embodiments, the purified UBC fiber fraction has a Kappa number above 5, preferably above 10, and more preferably above 20, as determined according to standard ISO 302:2015. Purified UBC fiber fractions obtained from some types of sources, e.g. sources containing mechanical pulp, may also have significantly higher Kappa numbers, such as above 30 or above 40 as determined according to standard ISO 302:2015.

In some embodiments, the purified UBC fiber fraction comprises less than 0.5 wt % plastic, preferably less than 0.1 wt % plastic, based on dry weight.

In some embodiments, the purified UBC fiber fraction comprises less than 0.5 wt % aluminum, preferably less than 0.1 wt % aluminum, based on dry weight.

In some embodiments, the purified UBC fiber fraction comprises less than 0.1 wt % OBA, preferably less than 0.05 wt % OBA, based on dry weight.

In some embodiments, the purified UBC fiber fraction comprises less than 50 mg/kg mineral oil saturated hydrocarbons (MOSH), preferably less than 20 mg/kg MOSH, based on dry weight.

In some embodiments, the purified UBC fiber fraction comprises less than 50 mg/kg mineral oil aromatic hydrocarbons (MOAH), preferably less than 20 mg/kg MOAH, based on dry weight.

In some embodiments, the purified UBC fiber fraction comprises less than 5000 mg/kg extractives, preferably less than 4000 mg/kg extractives, based on dry weight.

In some embodiments, the purified UBC fiber fraction comprises less than 800 mg/kg unsaturated fatty acids, preferably less than 600 mg/kg unsaturated fatty acids, based on dry weight.

In some embodiments, the purified UBC fiber fraction comprises less than 200 mg/kg resin acids, preferably less than 100 mg/kg resin acids, based on dry weight.

The amounts of extractives, unsaturated fatty acids, and resin acids were determined using the SCAN-CM 49 method with acidification of pulp to pH<3 using acetic acid. Extraction was made by ASE (Accelerated Solvent Extraction) with acetone at temperature of 100° C., pressure 2000 psi, and 2 cycles. The extracts were analyzed with GC-FID and then calculated against internal standards.

In some embodiments, the purified UBC fiber fraction in step (g) has an ash content (525° C.) below 2% and/or and an ash content (925° C.) below 1%. Purified UBC fiber fractions obtained from some types of sources, e.g. from sources containing mineral or pigment coated carton, may also have significantly higher ash contents.

Preferably, at least 99 wt % more preferably at least 99.5 wt %, and most more preferably at least 99.9 wt % of the purified UBC fiber fraction can be identified by chemical analysis.

In some embodiments, the purified UBC fiber fraction is mixed with fibers obtained from a chemical pulp, CMP, CTMP, HT-CTMP, TMP, or broke. The fibers may be softwood fibers, hardwood fibers or non-wood fibers and may be bleached or unbleached. In some embodiments the highly refined cellulose composition consists entirely or almost entirely of fibers obtained from UBC.

In some embodiments, the purified UBC fiber fraction is co-refined with fibers obtained from a chemical pulp, CMP, CTMP, HT-CTMP, TMP, or broke. The fibers may be softwood fibers, hardwood fibers or non-wood fibers and may be bleached or unbleached. In some embodiments the highly refined cellulose composition consists entirely or almost entirely of fibers obtained from UBC.

In some embodiments, the fiber fraction provided in step (i) is substantially free from lignin, preferably said fiber fraction has a lignin content below 20% by weight, based on the total dry weight of the fiber fraction.

In some embodiments, the fiber fraction provided in step (i) has a hemicellulose content in the range of 10-30% by weight, based on the total dry weight of the fiber fraction.

In some embodiments, the fibers obtained from UBC have not been dried prior to the pre-treatment and refining.

In some embodiments, the pre-treatment is selected from oxidation, enzymatic treatment, or the use of swelling chemicals such as co-solvents or alkali, or a combination thereof. In some embodiments, the pre-treatment is selected from enzymatic treatment and swelling with NaOH, or a combination thereof. The enzyme used for the enzymatic treatment may for example be a laccase, a cellulase, a hemicellulase, or a mixture or a combination thereof.

In some embodiments, the fiber fraction is subjected to refining at a consistency in the range of a consistency in the range of 1-10% by weight.

In some embodiments, the fiber fraction is subjected to refining to a Schopper-Riegler (SR) number in the range of 50-100, preferably in the range of 70-100, preferably in the range of 85-98, and more preferably in the range of 90-98, as determined by standard ISO 5267-1.

In some embodiments, the fiber fraction is subjected to refining with a total refining energy in the range of 20-1500 kWh/t, preferably in the range of 50-500 kWh/t.

In some embodiments, the highly refined cellulose composition has a content of fibers having a length >0.2 mm of at least 10 million fibers per gram based on dry weight, and preferably at least 15 million fibers per gram based on dry weight. The content of fibers having a length >0.2 mm may be determined using the Fiber Tester Plus instrument.

In some embodiments, the highly refined cellulose fiber composition has a mean fibril area of fibers having a length >0.2 mm value of at least 14%, preferably at least 20%, more preferably at least 22%. The mean fibril area is determined using the Fiber Tester Plus instrument.

Fiber mean length of fibers having a length >0.2 mm and fibril area of fibers having a length >0.2 mm were determined using the L&W Fiber Tester Plus (L&W/ABB) instrument (also referred to herein as "Fiber Tester Plus" or "FT+") with definition of fibers as fibrous particles longer than 0.2 mm according to standard ISO 16065-2.

A known sample weight of 0.100 g was used for each sample and the content of fibers having a length >0.2 mm (million fibers per gram) was calculated using the following formula: Million fibers per gram=(No. fibers in sample)/(Sample weight)/1 000 000=(Property ID 3141)/property ID 3136)/1 000 000.

In some embodiments, the highly refined cellulose composition is a microfibrillated cellulose (MFC) composition.

Microfibrillated cellulose (MFC) shall in the context of the patent application mean a cellulose particle, fiber or fibril having a width or diameter of from 20 nm to 1000 nm.

Various methods exist to make MFC, such as single or multiple pass refining, pre-hydrolysis followed by refining or high shear disintegration or liberation of fibrils. One or several pre-treatment steps is usually required in order to make MFC manufacturing both energy efficient and sustainable. The cellulose fibers of the pulp used when producing MFC may thus be native or pre-treated enzymatically or chemically, for example to reduce the quantity of hemicellulose or lignin. The cellulose fibers may be chemically modified before fibrillation, wherein the cellulose molecules contain functional groups other (or more) than found in the original cellulose. Such groups include, among others, carboxymethyl (CM), aldehyde and/or carboxyl groups (cellulose obtained by N-oxyl mediated oxidation, for example "TEMPO"), or quaternary ammonium (cationic cellulose). After being modified or oxidized in one of the above-described methods, it is easier to disintegrate the fibers into MFC.

According to a second aspect illustrated herein, there is provided a method for manufacturing a barrier paper or barrier film for a food or liquid packaging laminate, said method comprising:

a) providing a pulp suspension comprising a highly refined cellulose composition comprising fibers obtained from used beverage cartons (UBC) having a Schopper-Riegler (SR) number in the range of 50-100, and optionally a less refined cellulose composition having a Schopper-Riegler (SR) number in the range of 20-40, as determined by standard ISO 5267-1;

b) forming a paper or film substrate layer from the pulp suspension; and c) coating at least one side of the paper or film substrate layer with a polymeric gas barrier coating to obtain the barrier paper or barrier film for a food or liquid packaging laminate.

The pulp suspension comprises a highly refined cellulose composition, and optionally a less refined cellulose composition, suspended in an aqueous medium.

The highly refined cellulose composition may be further defined as described above with reference to the first aspect.

The less refined cellulose composition may be further defined as described above with reference to the first aspect.

Forming of a paper or film substrate layer from the pulp suspension can be done using methods well known in the art, such as by forming and dewatering on a wire in a Fourdrinier type paper machine. The consistency of the pulp suspension may for example be in the range of 0.1-1.5 wt %.

At one or both sides of the formed paper or film substrate layer is then coated with a polymeric gas barrier coating. In some embodiments, the polymeric gas barrier coating comprises one or more water soluble film forming polymers. In some embodiments, the polymeric gas barrier coating comprises one or more water soluble or water dispersible film forming polymers selected from the group consisting of polysaccharides, proteins, hemicellulose, polyvinyl alcohol, polyvinyl alcohol acetate, polyvinyl acetate, polyvinyl pyrrolidone, acrylic polymers, acrylic copolymers, polyurethane, and latex emulsions, such as styrene/acrylate latex. In some embodiments, the polysaccharides are selected from starch, modified starch, alginate, alginic acid, and cellulose derivatives, preferably carboxymethyl cellulose. In some embodiments, the polyvinyl alcohol is hydrolyzed to at least 88%, preferably above 92%.

The coat weight of the polymeric gas barrier coating is preferably in the range of 0.1-12 gsm, preferably in the range of 0.3-12 gsm, and more preferably in the range of 1-8 gsm. The polymeric gas barrier coating may be applied in a single layer as multiple layers.

In some embodiments, the substrate layer is subjected to calandering before and/or after the polymeric gas barrier coating is applied. The calandering may include machine calandering, soft calandering and/or supercalandering. One preferred method is to machine or soft calander the substrate layer before coating and then to soft or supercalander the coated substrate layer after coating.

The polymeric gas barrier coating may for example be applied by rod coating, blade coating, spray coating, curtain coating, gravure coating, flexography, or surface sizing or film press techniques.

The barrier paper or barrier film may be provided with a polymeric sealing layer on one side or on both sides. The polymeric sealing layer provides liquid and moisture resistance to the barrier paper or barrier film and may also allow heat lamination of the barrier paper or barrier film to other layers of a packaging laminate as well as heat sealing of the finished packaging laminate. The polymeric sealing layer may for example be applied by extrusion coating, film lamination or dispersion coating.

In some embodiments, the polymeric sealing layer is applied by glue lamination. Glue lamination may for example be performed using a polymeric dispersion comprising a polyolefin, a styrene-acrylate (SA) latex, or a polyvinyl alcohol (PVOH).

In some embodiments, the polymeric sealing layer is applied in the form of a heat lamination of a thermoplastic polymer film, by extrusion coating lamination of a thermoplastic polymer, or by application of a solution or dispersion of a thermoplastic polymer.

The polymeric sealing layer may comprise any of the thermoplastic polymers commonly used in paper or paperboard based packaging materials in general or polymers used in liquid packaging board in particular. Examples include polyethylene (PE), polyethylene terephthalate (PET), polypropylene (PP), polyhydroxyalkanoates (PHA), polylactic acid (PLA), polyglycolic acid (PGA), thermoplastic starch and thermoplastic cellulose. Polyethylenes, especially low density polyethylene (LDPE) and high density polyethylene (HDPE), are the most common and versatile polymers used in liquid packaging board.

Thermoplastic polymers, are useful since they can be conveniently processed by extrusion coating techniques to form very thin and homogenous films with good liquid barrier properties. In some embodiments, the polymeric sealing layer comprises polypropylene or polyethylene. In preferred embodiments, the polymeric sealing layer comprises polyethylene, more preferably LDPE or HDPE.

In some embodiments, the polymeric sealing layer is formed by extrusion coating. Extrusion coating is a process by which a molten plastic material is applied to a substrate to form a very thin, smooth and uniform layer. The coating can be formed by the extruded plastic itself, or the molten plastic can be used as an adhesive to laminate a solid plastic film onto the substrate. Common plastic resins used in extrusion coating include polyethylene (PE), polypropylene (PP), and polyethylene terephthalate (PET).

The basis weight of each polymeric sealing layer is preferably less than 50 g/m$^2$. In order to achieve a continuous and substantially defect free film, a basis weight of the polymer layer of at least 8 g/m$^2$, preferably at least 12 g/m$^2$ is typically required. In some embodiments, the basis weight of the polymeric sealing layer is in the range of 8-50 g/m$^2$, preferably in the range of 12-50 g/m$^2$.

According to a third aspect illustrated herein, there is provided a method for manufacturing a food or liquid packaging laminate, said method comprising laminating a barrier paper or barrier film according to the first aspect, or manufactured according to the second aspect, to a paper or paperboard substrate. The lamination may for example be done using wet glue lamination or by heat lamination using a thermoplastic polymer. The thermoplastic polymer used may be the same as those used in the polymeric sealing layer. The heat lamination may for example be extrusion coating lamination or lamination using a thermoplastic polymer film as a tie layer. In some embodiments, a polymeric gas barrier layer or polymeric sealing layer of the barrier paper or barrier film also act as a tie layer between the barrier paper or barrier film and the paper or paperboard substrate. The polymeric gas barrier layer or polymeric sealing may thus act as a tie layer between the paperboard layer and the barrier layer. In an alternative embodiment, the barrier paper or barrier film is laminated to the paper or paperboard substrate by wet on wet lamination.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out this invention, but that the invention will include all embodiments falling within the scope of the appended claims.

EXAMPLES

Example 1—Preparation of Raw UBC Pulp

Figure 1:
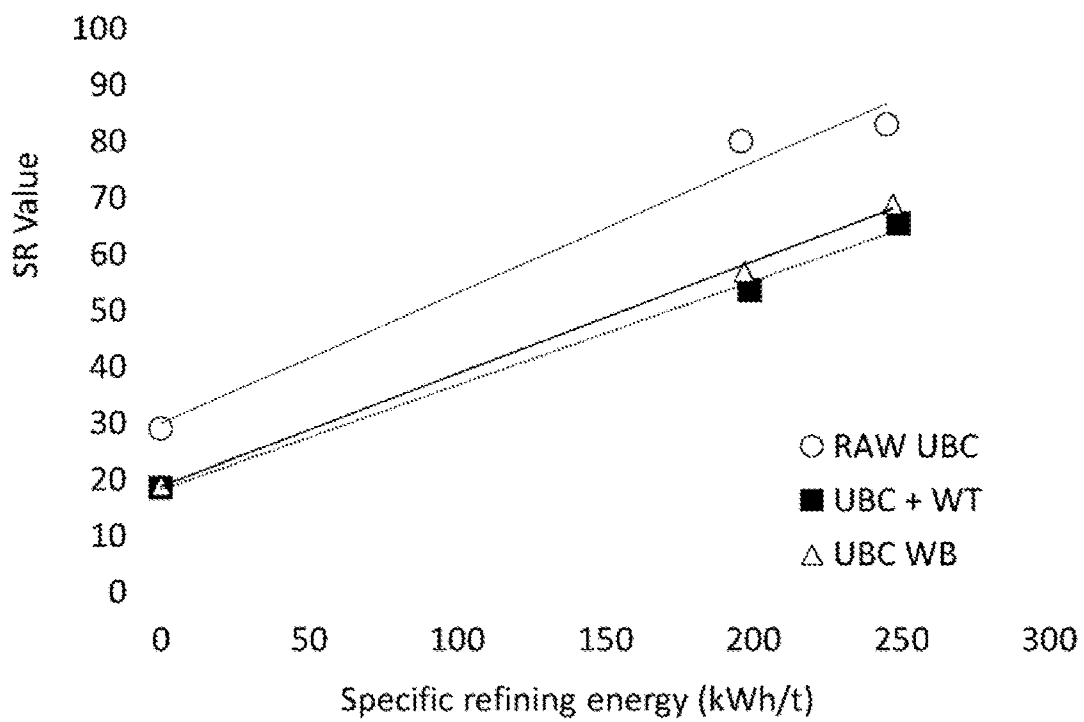
FIG. 1 is a diagram showing the Schopper Riegler value plotted versus the applied specific refining energy for unrefined and refined recycled UBC pulps.

Collected post-consumer UBC starting material was subjected to a polymer and aluminum film separation method to obtain a polymer and aluminum fraction and a fiber fraction. The UBC was treated with water in a drum pulper (drum speed 10.7 U/min) for 25 minutes at about 50° C. and at a consistency of ca 18-20 wt %. The polymer-aluminum fraction was separated from the UBC and the remaining pulp is denoted here as Raw UBC pulp (1). The screening drum was equipped with 8 mm holes. The polymer and aluminum fraction constituted about 30-35 wt % of the dry weight of the UBC starting material. The fiber composition of the raw UBC pulp was as follows:

Bleached softwood kraft: 12 wt %
Unbleached softwood kraft: 25 wt %
Unbleached hardwood kraft: 20 wt %
Softwood CTMP: 33 wt %
Hardwood CTMP: 10 wt %

The results of fiber and water analysis of the raw UBC pulp, denoted as sample (1) are shown in Tables 1, 2 and 3.

The amount of extractives in this pulp sample was 13900 mg/kg (acetone extract), whereas the amount of unsaturated fatty acids (free and bound) were 2365 mg/kg. The amount of resin acids were 511 mg/kg, whereof free sterols were 49 mg/kg and bound sterols were 37 mg/kg.

The pH of the filtrate was 6.74, the amount of suspended solids was 33 mg/l and BOD after 5 days was 500 mg/l and COD was 820 mg/l. Phosphorous content and total nitrogen content of the filtrate were 2.1 mg/l and 26 mg/l, respectively.

Example 2—Coarse Screening of Raw UBC

The raw UBC pulp prepared in Example 1 was then diluted and subjected to a coarse screening at a consistency of 1.6 wt %. The screener had a step rotor alongside the contour-hole screen basket so that large flat contaminants were efficiently removed (rotor speed 730 m/min). The holes in the screen were 1.6 mm in diameter. The accepted stream (output, consistency 1.4 wt %) was then collected and analysed. The reject (reject rate 14 wt %), was subjected to another screening and deflaking unit having screening holes of 2.4 mm. The accept was then collected and used as the output stream, whereas the reject was subjected to a reject sorter having 2.4 mm holes in the screens (Reject sorter, rotor speed 1600 m/min, consistency 2.2 wt %, dilution water 50 L/min). Temperature of the obtained accept flows (consistency 1.4 wt %) were about 37° C. The output stream, denoted as sample (2), was analyzed and the results are presented in Tables 1-3.

Example 3—Fine Screening and Washing

The output stream obtained in example 2 was diluted to a consistency of 1 wt % with hot water (68° C.) and then subjected to high-speed washing/dewatering and fractionation by feeding the pulp suspension by wire tension around a smooth roll in a belt-type washer. The consistency of the pulp after washing and drainage was about 12 wt % and the temperature of the pulp was about 60° C. Washing/dewatering in the belt-type washer reduced the ash content of the fiber fraction by 49%. Basis weight of the dewatered fiber substrate was about 31 gsm.

The treated UBC was further subjected to a dilution step and then to fine screening using 2 forward screener cleaners (hydrocyclones) at a consistency of 1.4 wt % (reject quantity 4.7 wt %, dilution water 60 l/min) and then a second forward cleaner step at a consistency of 1.2 wt % (reject quantity 5.7 wt %, dilution water 65 l/min) and to 2 rotor screeners based on centrifugal screening principle (Multifoil rotor) operated in cascade mode at a consistency of 1.3 wt % and then subjected to a thickener step (inlet consistency 1.2 wt % and accept consistency 6.1 wt %. The accept had an ash content of 2.1 wt %). The temperature of the pulp was about 60-70° C. The slit size in the screens was 0.15 mm. The obtained purified UBC pulp, denoted as sample (3), was analyzed and the results are presented in Tables 1-3.

Example 4—Thickening, Heat Dispersion and Dewatering

The fine screened, washed and thickened material obtained in Example 3 was further fed to a screw press and heating screw and heater (inlet consistency 3.4 wt %, accept consistency 40 wt %, Screw speed 50 U/min) followed by a hot disperger operated at about 115° C. (rotor speed 1500 U/min, inlet consistency 35 wt %, gap 4.4 mm, accept consistency 10.5 wt %). After the disperger, the consistency of the pulp was 10.5 wt %. A dilution and washing at low consistency were performed (with high-speed washing/dewatering unit) before dewatering in a screw press to a consistency of about 30 wt %.

The washed and screened material denoted as sample (4), was analyzed and the results are presented in Tables 1-3. The results showed that a significant amount of extractives could be removed compared to the reference sample 1 (Raw UBC pulp). The amounts of extractives in this pulp sample was 3200 mg/kg (acetone extract), whereas the amount of unsaturated fatty acids (free and bound) were 591 mg/kg. The amount of resin acids was 62 mg/kg, whereof the amounts of free and bound sterols were to 15 and 8 mg/kg, respectively.

The pH of the filtrate was 8.4, the amount of suspended solids was 16 mg/l and BOD after 5 days was 13 mg/l and COD was 44 mg/l. Phosphorous content and total nitrogen content of the filtrate were 0.7 mg/l and <1 mg/l, respectively.

Example 5—Heating and High Consistency Deactivation

The material obtained in Example 4 was further subjected to a screening press and heating screen operated at T>80° C.

and further to a high consistency disperger, also operating at higher temperature. The purpose was to further dewater the pulp and to deactivate microbial activity at higher consistency. After the high consistency disperger, the pulp was subjected to deactivation at high consistency with 3.3% peroxide and NaOH and Silicate at a temperature of ca 85° C. The purpose of this treatment was to deactivate remaining microbial activity.

The obtained deactivated UBC pulp, denoted as sample (5), was analyzed and the results are presented in Tables 1-3. The results show that, e.g., the amounts of extractives could be further reduced, but also that the microbial activity is significantly reduced. The amounts of extractives in this pulp sample was 2500 mg/kg (acetone extract), whereas the amount of unsaturated fatty acids (free and bound) were 495 mg/kg. The amount of resin acids was 49 mg/kg, whereof free and bound sterols were reduced to 11 and 8 mg/kg, respectively.

Example 6 Comparative—UBC Treatment in OCC Plant

In this case, the collected UBC pulp was subjected to a drum pulper and fractionation based on a conventional OCC plant concept. The obtained UBC pulp, denoted as sample (6), was analyzed and the results are presented in Tables 1-2. The results show that the plastic content is relatively high and that also Al and Ca concentrations remains on a high level.

Example 7 Comparative—UBC Treatment in OCC Plant

Similar as Example 6, but the pulp was further treated in a hot disperger, which is designed and intended for treatment of OCC. The obtained UBC pulp, denoted as sample (7), was analyzed and the results are presented in Tables 1-2. A small improvement in fiber yield could be seen as well as a small reduction in plastic content. Compared to (6), a small improvement in the metal salts could be seen although these are still on a high level.

The solid content of this suspension was 7.6 wt %, the SR value was 33, and the WRV value was 163, which indicates a high drainage resistance.

TABLE 1

| | Unit | 1 | 2 | 3 | 4 | 5 | 6 | 7 |
|---|---|---|---|---|---|---|---|---|
| Consistency | | 3% | 2% | 6% | 27% | 35% | 25-28% | 8% |
| Fibre content, calculated | % | 92.0 | | | 98.7 | 98.6 | 87 | 92 |
| Content | | | | | | | | |
| Plastic content (microplastic) | % | 1.5 | | | 0.15 | 0.15 | 2 | 1.2 |
| Ash content @ 525° C. | % | 6.5 | | | 1.18 | 1.2 | 10.63 | 6.69 |
| Ash content @ 925° C. | % | 5.0 | | | 0.86 | 0.8 | 9.01 | 5.35 |
| Metal analysis of ash: | | | | | | | | |
| Na | % | 0.11 | | | <0.004 | 0.008 | 0.40365 | 0.09416 |
| Mg | % | 0.051 | | | 0.014 | 0.013 | 0.0874 | 0.05511 |
| Al | % | 0.52 | | | 0.045 | 0.026 | 1.03525 | 0.6511 |
| Al (best estimate for metallic aluminium) | % | 0.22 | | | 0.028 | 0.014 | 0.92 | 0.5 |
| Si | % | 0.55 | | | 0.047 | 0.036 | 0.78297 | 0.53233 |
| P | % | 0.036 | | | 0.005 | 0.004 | 0.07478 | 0.02889 |
| S | % | 0.074 | | | 0.048 | 0.038 | 0.25228 | 0.09577 |
| Cl | % | <0.025 | | | <0.004 | <0.004 | 0 | 0 |
| K | % | 0.031 | | | <0.004 | <0.004 | 0.07659 | 0.02622 |
| Ca | % | 1.6 | | | 0.36 | 0.39 | 2.52640 | 1.62908 |
| Ti | % | 0.026 | | | <0.004 | <0.004 | 0.06307 | 0.02943 |
| Cr | % | <0.025 | | | <0.004 | <0.004 | 0 | 0 |
| Mn | % | <0.025 | | | <0.004 | <0.004 | 0 | 0 |
| Fe | % | 0.042 | | | 0.008 | 0.006 | 0.10812 | 0.06741 |
| Ni | % | <0.025 | | | <0.004 | <0.004 | | |
| Chemical properties | | | | | | | | |
| Dry matter content (water: residue on evaporation) | % | 2.0 | | | 21.9 | 34.9 | | |
| Mineral oils (MOSH C10-C35) | mg/kg | 36 | | | <10 | <10 | | |
| Mineral oils (MOAH C10-C35) | mg/kg | <10 | | | <10 | <10 | | |
| Bisphenol-A | mg/kg | 0.05 | | | 0.03 | <0.02 | | |
| Total volatile content | µg/kg (ppb) | 7690 | | | 2940 | 2920 | 12615 | 4430 |
| Hexanal | µg/kg (ppb) | 1675 | | | 520 | 520 | 1280 | 1075 |

(dry matter basis. % (means wt %)

TABLE 2

| Microbology and cultivations (mirobes, spores, mould, yeast) | | | | | | |
|---|---|---|---|---|---|---|
| Microbiology. cultivations | Unit ISEGA | 1 | 2 | 3 | 4 | 5 |
| Total count of microbes, wet pulp | CFU/g wet pulp | 8.20E+07 | 9.5E+07 | 3.3E+04 | 6.7E+07 | 4.4E+04 |
| Total count of bacterial spores, wet pulp | CFU/g wet pulp | <1.0E+05 | 5.0E+04 | 1.2E+04 | 3.3E+04 | 1.0E+03 |
| Total count of mould, wet pulp | CFU/g wet pulp | 8.50E+04 | | 1.5E+01 | | <10 |
| Total count of yeast, wet pulp | CFU/g wet pulp | <1.0E+03 | | <10 | | <10 |
| Total count of microbes, calculated value b.d. Pulp | CFU/g b.d. pulp | 2.9E+08 | 2.7E+08 | 5.5E+04 | 2.5E+07 | 1.3E+04 |
| Total count of bacterial spores, calculated value. b.d. Pulp | CFU/g b.d. pulp | 3.6E+05 | 1.4E+05 | 2.0E+04 | 1.2E+04 | 2.9E+02 |

TABLE 3

| Pulp and fiber properties | | | | | | |
|---|---|---|---|---|---|---|
| Property | Unit | 1 | 2 | 3 | 4 | 5 |
| Dry matter content | % | 4.4 | 1.6 | 33.1 | 19.6 | 34.7 |
| Canadian-Freeness | ml | 620 | 645 | 620 | 625 | 640 |
| WRV 100 mesh | % | 127 | 131 | 127 | 126 | 124 |
| Drainability | ° SR | 16.5 | 15.5 | 17 | 16 | 15.5 |
| Fiber length Lc(n) FS5 ISO | mm | 1.01 | 1.01 | 1.03 | 1.04 | 1.02 |
| Fiber length Lc(l) FS5 ISO | mm | 1.6 | 1.62 | 1.58 | 1.59 | 1.58 |
| Fiber length Lc(w) FS5 ISO | mm | 2.22 | 2.23 | 2.17 | 2.18 | 2.19 |
| Fiber curl FS5 | % | 8.6 | 9.5 | 11.5 | 12.2 | 14.3 |
| Fibrillation FS5 | % | 1.95 | 2.05 | 1.7 | 1.73 | 1.71 |
| Fines A FS5 | % | 27.41 | 29.06 | 16.3 | 13.27 | 13.49 |
| Kink (1/1000) FS5 | 1/1000 | 516.57 | 496.43 | 1116.43 | 1040.17 | 1543.4 |
| Kink (1/m) FS5 | 1/m | 510.4 | 489.4 | 1081.4 | 1001.97 | 1513.77 |
| f1(l) FS5 0-0.2 mm | % | 17.2 | 17.77 | 8.77 | 6.97 | 7.13 |
| f2(l) FS5 0.2-0.6 mm | % | 10.4 | 10.23 | 10.8 | 10.77 | 11.43 |
| f3(l) FS5 0.6-1.2 mm | % | 27.93 | 27.23 | 31.7 | 32.3 | 32.4 |
| f4(l) FS5 1.2-2.0 mm | % | 18.83 | 18.87 | 21 | 21.63 | 20.57 |
| f5(l) FS5 2.0-3.2 mm | % | 18.6 | 18.83 | 21 | 21.4 | 21.4 |
| f6(l) FS5 3.2-7.6 mm | % | 7.1 | 7.07 | 6.83 | 6.9 | 7.13 |

Example 8—Manufacturing Trial of a 3-Ply Liquid Paperboard

The paperboard manufacturing tests were performed on a pilot machine based on Fourdrinier technology having 3 wires and 3 headboxes, following a press section, drying and surface sizing and calandering section and finally winding station. Starch was added as a ply bonding agent at an amount of 1.8 gsm between the top and mid ply and between the mid and back ply.

The pulp mixtures and composition of the layers are shown in Table 4 and the test results for the obtained 3-ply board are shown in Table 5. The total grammage of the 3-ply board was 250 g/m$^2$. Targeted moisture content was 7.5%.

A trial point with raw UBC pulp was not performed due to high bacterial activity and unpleasant odor and high content of impurities. Instead, as a reference, a high kappa (brown) pulp was used in the mid ply together with broke (internal furnish, i.e. reused pulp).

Example 9—High Amount of Pulp from UBC in Mid-Ply

The purified UBC pulp obtained in Example 4 was used in a paperboard manufacturing trial of a 3-ply liquid paperboard. The purified UBC pulp was prepared at a solid content of 35 wt %. During the trials, no smell or odor were observed and bacterial activity for this particular pulp was normal for papermaking conditions.

The total amount of UBC pulp in the paperboard corresponded to 30% of the total board grammage (fiber), whereas the percentage in the mid ply was 53%.

A small reduction in some strength properties of the board could be seen, whereas for example Z-strength was still above the benchmark. The example confirms that high yield pulp or high kappa pulp can be replaced with pulp from UBC.

Example 10—Low Amount of Pulp from UBC in Mid-Ply

In this case, the mid-ply composition was changed so that the UBC pulp was mixed in lower amount and with higher content of high yield pulp than in the previous example. The total amount of pulp from UBC in the board was about 15%. The example confirms that high yield pulp or high kappa pulp can be replaced with pulp from UBC.

Example 11—High Amount of Pulp from UBC, Highly Refined

In this case, more highly refined pulp from UBC was added to mid ply (53%) together with broke and high yield pulp. This amount corresponded to the use of 30% pulp from UBC in the whole board structure. Despite the high amount of UBC pulp, no effect on optical properties or mechanical properties were seen, see Table II. In fact, a significant improvement in the Z-strength was obtained.

Example 12—Low Amount of Pulp from UBC, Highly Refined

In this case, the mid-ply composition was changed so that the highly refined pulp from UBC was mixed in lower amount and with higher content of high yield pulp than in the previous example. The total amount of pulp from UBC in the board was about 15%. This example confirms that the UBC pulp can be used with higher content of high yield pulp and it actually improves some strength properties such as Scott bond and Z-strength.

TABLE 4

| Trial point | Unit | 8 | 9 | 10 | 11 | 12 |
|---|---|---|---|---|---|---|
| Top Ply | | | | | | |
| Grammage | g/m2 | 70.3 | 70.3 | 70.3 | 70.3 | 70.3 |
| HW Kraft | % | 100 | 100 | 100 | 100 | 100 |
| Mid ply | | | | | | |
| Grammage | g/m2 | 145.9 | 145.9 | 145.9 | 145.9 | 145.9 |
| High Yield pulp | % | 65 | 12 | 38 | 12 | 38 |
| Broke | % | 35 | 35 | 35 | 35 | 35 |
| UBC SR50 | % | | | | 53 | 27 |
| UBC SR30 | % | | 53 | 27 | | |
| Back ply | | | | | | |
| Grammage | g/m2 | 43 | 43 | 43 | 43 | 43 |
| High yield pulp | % | 100 | 100 | 100 | 100 | 100 |

TABLE 5

| Trial point | Unit | 8 | 9 | 10 | 11 | 12 |
|---|---|---|---|---|---|---|
| Grammage | g/m2 | 261.5 | 267.3 | 269.1 | 260.9 | 263.5 |
| Thickness single sheet | μm | 392 | 396 | 420 | 386 | 387 |
| Density single sheet | kg/m3 | 667 | 675 | 641 | 676 | 681 |
| Air resistance G-H | s/100 ml | 20 | 22 | 19 | 30 | 25 |
| Air permeability G-H | μm/Pas | 6.5 | 5.9 | 6.6 | 4.3 | 5.0 |
| Scott-Bond, md | $J/m^2$ | 323 | 315 | 328 | 323 | 371 |
| Tensile index, md | Nm/g | 83.2 | 73.7 | 71.5 | 79.7 | 79.9 |
| Tensile index, cd | Nm/g | 38.3 | 37.6 | 39.5 | 43.3 | 40.7 |
| Stretch, md | % | 1.6 | 1.7 | 1.6 | 1.7 | 1.6 |
| Stretch, cd | % | 3.8 | 4 | 4.1 | 4.3 | 3.9 |
| Tensile stiffness index, md | kNm/g | 9.6 | 8.7 | 8.7 | 9.2 | 9.3 |
| Tensile stiffness index, cd | kNm/g | 4.0 | 3.9 | 4.1 | 4.3 | 4.2 |
| E-modulus, md | MPa | 6411 | 5719 | 5513 | 6384 | 6176 |
| E-modulus, cd | MPa | 2687 | 2574 | 2578 | 2993 | 2805 |
| TEA index, md | J/g | 0.82 | 0.79 | 0.74 | 0.88 | 0.80 |
| TEA index, cd | J/g | 1.04 | 1.09 | 1.17 | 1.33 | 1.16 |
| Tear index, md | $mNm^2/g$ | 15.4 | 16 | 15.9 | 15.3 | 16 |
| Tear index, cd | $mNm^2/g$ | 16.5 | 15.5 | 17.1 | 14.9 | 15.9 |
| SCT index, md | Nm/g | 29.4 | 26.0 | 26.7 | 28.6 | 27.6 |
| SCT index, cd | Nm/g | 17.7 | 17.4 | 17.3 | 20.6 | 18.4 |
| Z-strength | kPa | 376 | 380 | 382 | 416 | 405 |
| Brightness C/2° + UV, ts | % | 71.1 | 71.4 | 71.9 | 71.4 | 71.4 |
| L* C/2° + UV, ts | | 88.6 | 88.9 | 89.1 | 89.0 | 88.8 |
| a* C/2° + UV, ts | | 0.17 | 0.26 | 0.23 | 0.24 | 0.19 |
| b* C/2° + UV, ts | | 1.93 | 2.22 | 2.16 | 2.3 | 2.05 |
| Opacity C/2° + UV, ts | % | 99.9 | 99.9 | 99.8 | 99.9 | 99.8 |
| L&W Bending resistance index 50 mm 15° MD | $Nm^6/kg^3$ | 16.5 | 16.1 | 18.4 | 16.6 | 16.2 |
| L&W Bending resistance index 50 mm 15° CD | $Nm^6/kg^3$ | 8.2 | 8.3 | 9.7 | 7.9 | 8.3 |
| L&W Bending resistance index 50 mm 15° GM | $Nm^6/kg^3$ | 11.63 | 11.56 | 13.36 | 11.45 | 11.60 |

Figure 2:
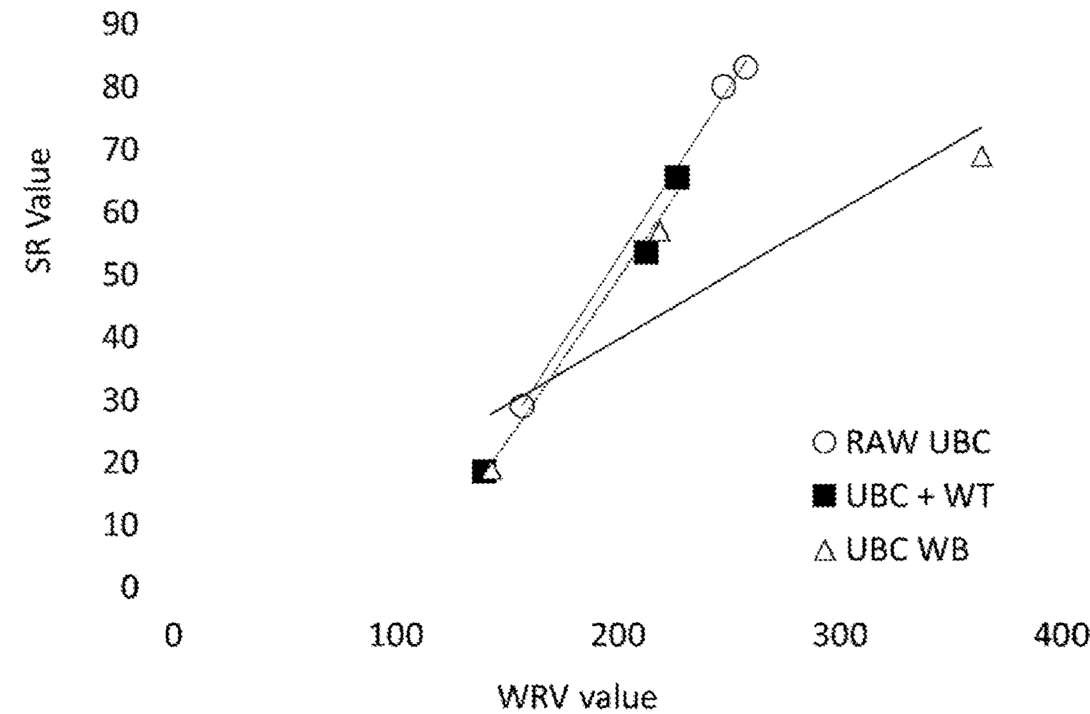
FIG. 2 is a diagram showing the Schopper Riegler value plotted versus water retention value, WRV for unrefined and refined recycled UBC pulps.
Figure 3:
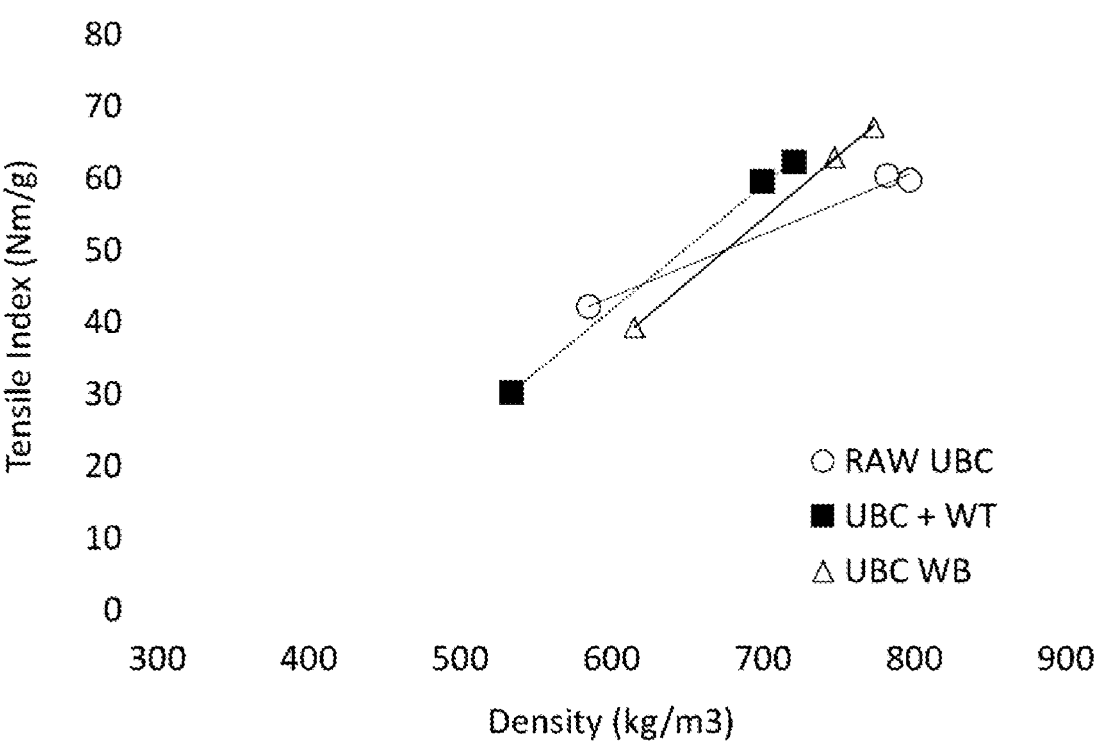
FIG. 3 is a diagram showing tensile index plotted versus sheet density for unrefined and refined recycled UBC pulps.
Figure 4:
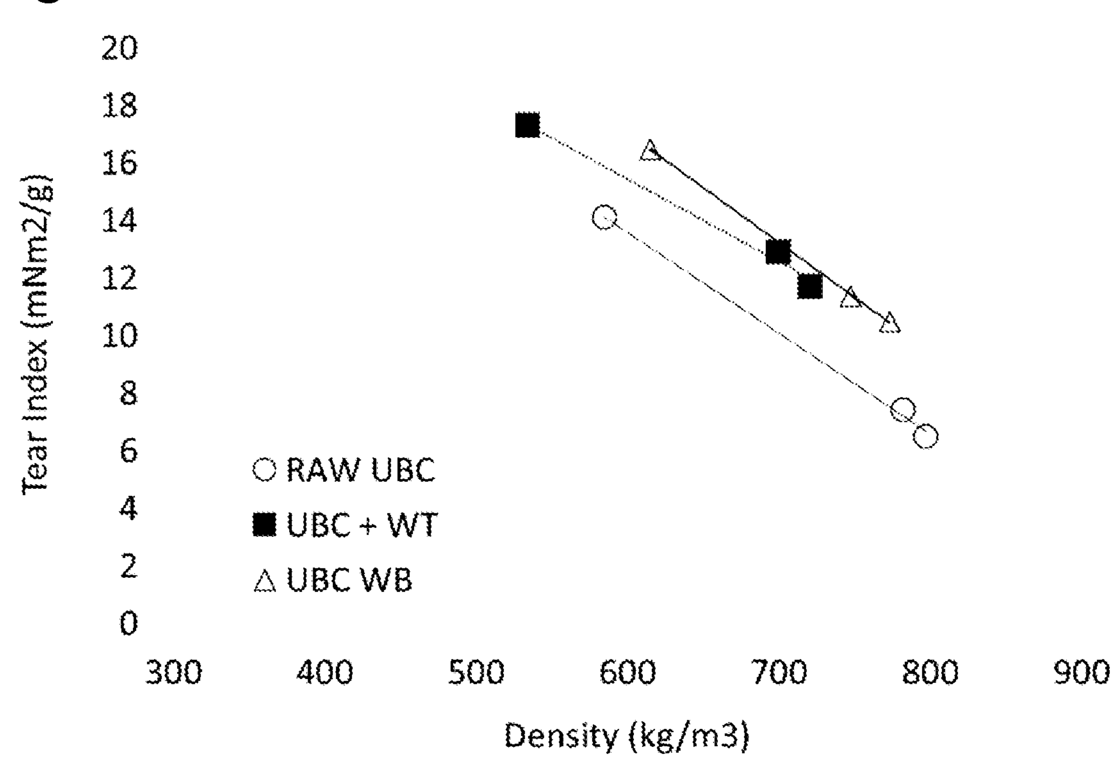
FIG. 4 is a diagram showing tear index plotted versus sheet density for unrefined and refined recycled UBC pulps.

Example 13—Effect of Washing and Refining on Strength Properties of the Treated UBC Pulp The UBC pulps obtained from Examples 1, 4 and 5 were used as starting material. Three samples of each pulp were prepared, one was unrefined and two were subjected to two different levels of refining in a Voith LR40 refiner (consistency 4%, fillings 3-1, 0-60C, specific edge load 2.5 J/m). 160 gsm sheets of each sample pulps were prepared according to a standard procedure, and the strength and physical properties of the sheets were examined. The results are presented in the diagrams in FIG. 1-4. In the diagrams, "RAW UBC" refers to the UBC pulp obtained from Example 1, "UBC+WT" refers to the UBC pulp obtained from Example 4, and "UBC WB" refers to the UBC pulp obtained from Example 5.

Although impurities and fines are removed during the extensive purification and thermal treatment of the UBC pulps obtained from Examples 4 and 5, the results surprisingly show that strength properties of the recycled and purified pulps can be maintained or improved.

Unless specified otherwise, the following parameters were measured according to the specified standard methods:

Dry matter content: ISO 638
WRV 100 mesh: ISO 23714
Fiber length Lc(I) FS5 ISO: ISO 16065
Drainability (SR): ISO 5267-1
pH: DIN 38404-C5: 2009-7
Suspended solids: DIN EN 872:2005-04
BOD: DIN EN 1899-1:1998-05
COD: DIN 38409-H41/SFS 5504:1988
Total Phosphorus: DIN EN ISO 11885:2009-09
Total Nitrogen: DIN EN 25663:1993-11

The invention claimed is:

1. A barrier paper or barrier film for a food or liquid packaging laminate, said barrier paper or barrier film comprising:

a substrate layer comprising a highly refined cellulose composition comprising fibers obtained from used beverage cartons (UBC), and a polymeric gas barrier coating disposed on at least one side of the substrate layer, wherein the highly refined cellulose composition has a Schopper-Riegler (SR) number in a range of 50-100, as determined by standard ISO 5267-1.

2. The barrier paper or barrier film according to claim 1, wherein said substrate layer comprises at least 50 wt % of the highly refined cellulose composition.

3. The barrier paper or barrier film according to claim 1, wherein said substrate layer further comprises fibers obtained from chemical pulp, CMP, CTMP, HT-CTMP, TMP, or broke.

4. The barrier paper or barrier film according to claim 1, further comprising: a polymeric gas barrier coating disposed on two sides of the substrate layer.

5. The barrier paper or barrier film according to claim 1, wherein the polymeric gas barrier coating comprises one or more water soluble or water dispersible film forming polymers selected from a group consisting of: polysaccharides, polyvinyl alcohol, polyvinyl alcohol acetate, polyvinyl acetate, polyvinyl pyrrolidone, acrylic polymers, acrylic copolymers, polyurethane, and latex emulsions.

6. The barrier paper or barrier film according to claim 1, further comprising: a polymeric sealing layer disposed on at least one side of the substrate layer.

7. The barrier paper or barrier film according to claim 1, further comprising: a polymeric sealing layer disposed on two sides of the substrate layer.

8. The barrier paper or barrier film according to claim 1, further comprising a polymeric sealing layer comprising a polyolefin layer.

9. The barrier paper or barrier film according to claim 1, wherein a grammage of the substrate layer is in a range of 15-120 gsm.

10. The barrier paper or barrier film according to claim 1, wherein the highly refined cellulose composition has a content of fibers having a length >0.2 mm of at least 10 million fibers per gram based on a dry weight.

11. The barrier paper or barrier film according to claim 1, wherein the highly refined cellulose fiber composition has a mean fibril area of fibers having a length >0.2 mm value of at least 14%.

12. The barrier paper or barrier film according to claim 1, wherein the highly refined cellulose composition is a microfibrillated cellulose (MFC) composition.

13. The barrier paper or barrier film according to claim 1, wherein the highly refined cellulose composition is obtained by:

i) providing a fiber fraction comprising 20-100 wt % fibers obtained from used beverage cartons (UBC) based on a total dry fiber weight of the fiber fraction, ii) optionally subjecting the fiber fraction to a mechanical pre-treatment, or a chemical pre-treatment, or an enzymatic pre-treatment, or a combination thereof, iii) subjecting the optionally pre-treated fiber fraction to refining at a consistency in a range of 0.5-30% by weight to a Schopper-Riegler (SR) value in a range of 50-100, as determined by standard ISO 5267-1, to obtain the highly refined cellulose composition.

14. A method for manufacturing a barrier paper or barrier film for a food or liquid packaging laminate, said method comprising:

a) providing a pulp suspension comprising a highly refined cellulose composition comprising fibers obtained from used beverage cartons (UBC) having a Schopper-Riegler (SR) number in a range of 50-100, and optionally a less refined cellulose composition having a Schopper-Riegler (SR) number in a range of 20-40, as determined by standard ISO 5267-1;

b) forming a paper or film substrate layer from the pulp suspension; and c) coating at least one side of the paper or film substrate layer with a polymeric gas barrier coating to obtain the barrier paper or barrier film for a food or liquid packaging laminate.

* * * * *